United States Patent [19]

Nomura

[11] Patent Number: 4,678,198
[45] Date of Patent: Jul. 7, 1987

[54] CONSTRUCTION OF MUDGUARD OF MOVABLE FENDER PORTION IN MOTOR VEHICLE

[75] Inventor: Kazuhiro Nomura, Anjyo, Japan

[73] Assignee: Toyota Jidosha Kabushiki Kaisha, Japan

[21] Appl. No.: 611,339

[22] Filed: May 17, 1984

[30] Foreign Application Priority Data

May 19, 1983 [JP] Japan .................................. 58-74912

[51] Int. Cl.$^4$ ............................................... B62B 9/14
[52] U.S. Cl. ................................. 280/153 A; 49/246; 296/198
[58] Field of Search .................. 49/149, 153, 246, 248; 280/152 A, 153 A, 153 R, 154.5 R; 296/196, 198

[56] References Cited

U.S. PATENT DOCUMENTS

| 1,289,911 | 12/1918 | Richter | 280/153 R |
| 3,095,600 | 7/1963 | Bretzner | 49/248 |
| 3,275,370 | 9/1966 | Smith | 49/248 |

FOREIGN PATENT DOCUMENTS

| 902405 | 8/1958 | United Kingdom . | |
| 2046183 | 11/1980 | United Kingdom | 296/198 |

Primary Examiner—John J. Love
Assistant Examiner—Richard M. Camby
Attorney, Agent, or Firm—Finnegan, Henderson, Farabow, Garrett & Dunner

[57] ABSTRACT

A construction of a mudguard of a movable fender portion in a motor vehicle.

The motor vehicle is provided therein with a side door hinge mechanism utilizing a quadric crank chain comprising: a front rotary link interconnecting two points which are disposed at the front side of a vehicle body and a side door in the motor vehicle as rotary shafts out of four points including two points disposed on the vehicle body and spaced apart from each other in the longitudinal direction of the vehicle body and two points disposed on the side door and spaced apart from each other in the longitudinal direction of the side door; a rear rotary link interconnecting two points disposed at the rear sides as rotary shafts; a portion between the two points on the vehicle body; and a portion between the two points on the side door. Further, in the motor vehicle, a portion of a fender covering the outer surface of at least a part of the front rotary link is formed into a movable fender rotatable integrally with the rotary shaft of the front rotary link as centered thereabout, a portion of a wheel arch flare positioned at least forwardly of the movable fender is extended into a wheel house at a position forwardly of a moving path of the movable fender, and the forward end of the extension is connected to an inner wall of the wheel house, whereby a mudguard partitioning the front wheel from the movable fender is formed.

8 Claims, 4 Drawing Figures

CONSTRUCTION OF MUDGUARD OF MOVABLE FENDER PORTION IN MOTOR VEHICLE

BACKGROUND OF THE INVENTION

1. Field of the Invention

This invention relates to construction of a mudguard of a movable fender portion in a motor vehicle with a side door hinge utilizing a quadric crank chain mechanism.

2. Description of the Related Art

In most cases, the side door in a motor vehicle, e.g. passenger car has heretofore been installed in a manner to be rotatable about a hinge affixed to a vehicle body for opening or closing. In order to allow an occupant of the motor vehicle to open or close the side door for getting on or off the motor vehicle, a door opening angle corresponding to the total length of the side door is required. At this time, when a space at the side of the motor vehicle is small, there are many cases where it is difficult for the occupant to get on or off the vehicle because the side door cannot be opened sufficiently.

In contrast thereto, as has been seen in many documents such for examples as U.S. Pat. Nos. 3,275,370 and 3,095,600, there has been proposed a side door hinge mechanism formed by utilizing a quadric crank chain mechanism.

Furthermore, as proposed in U.S. patent application Ser. Nos. 611,216 and 611,149 (Japanese Utility Model Application Nos. 74913/83) and 73460/83 by the present applicant, respectively, as shown in FIGS. 1 and 2, a side door hinge utilizing a quadric crank chain comprises: a rotary link 4 interconnecting two rotary shafts 2A and 2B which are disposed on the forward sides of a vehicle body 2 on a forward portion of and a side door 3 in a motor vehicle 1 respectively; a rotary link 5 interconnecting two rotary shafts 2B and 3B which are disposed on the vehicle body 2 and the side door 3 and spaced upward and rearward from rotary shafts 2A and 2B on the side door 3; a portion between the rotary shafts 3A and 3B on the vehicle body 2; and a portion between the two points on the side door 3, whereby a side door hinge mechanism in a motor vehicle is formed.

In the drawing, designated at 6 is a front pillar, 7 a front wheel and 8 a movable fender rotatable with the rotary link 4, respectively.

The side door hinge mechanism utilizing the above-described quadric crank chain mechanism can reduce an essential space at the side of the motor vehicle with a space at the feet of an occupant of the vehicle being secured. In consequence, even when the space at the side of the motor vehicle is small, the occupant can open or close the side door 3 to get on or off the vehicle.

Now, in general, since the front wheel 7 splashes muddy water up rearwardly during running in rain for example, in a type of a motor vehicle provided with a front pillar positioned along an inner frontal portion of a side fender, it is necessary to provide mudguards on the front faces of the rotary shaft 2A and the movable fender 8.

However, as shown in FIG. 2, the movable fender 8 is forwardly rotated with the rotary link 4 when the front side door 3 is opened. Therefore, if the mudguard is mounted on the front face of this movable fender 8, such a disadvantage is presented that, since the mudguard interferes with the front pillar 6 and the front wheel 7, no mudgard can be provided.

SUMMARY OF THE INVENTION

It is therefore the primary object of the present invention to provide a construction of a mudguard, which does not interfere with the front wheel and the front pillar, even if the movable fender is rotated when the front side door is opened.

To the above end, the present invention contemplates, in construction of a mudguard of a movable fender portion in a motor vehicle provided with a front pillar positioned along an inner portion of a fender, a side door hinge mechanism having a quadric crank chain mechanism comprising: a front rotary link interconnecting two rotary shafts which are disposed on the front pillar and at the front side of a vehicle body, respectively, in the motor vehicle; a rear rotary link interconnecting two rotary shafts disposed on the vehicle body and the side door and spaced upward and rearward from the front rotary link; a portion between the two points on the vehicle body; and a portion between the rotary shafts on the side door, wherein a portion of a fender covering the outer surface of at least a part of the front rotary link is formed into a movable fender rotatable integrally with the rotary shaft of the front rotary link as centered thereabout, a portion of a wheel arch flare positioned at least forwardly of the movable fender is extended into a wheel house at a position forwardly of a moving path of the movable fender, and the forward end of the extension is connected to an inner wall of the wheel house, whereby a mudguard partitioning the front wheel from the movable fender is formed.

To the above end, the present invention contemplates that the mudguard is integrally formed on an upper fender as being a portion other than said movable fender in the front fender.

To the above end, the present invention contemplates that the mudguard is formed separately of the upper fender as being a portion other than said movable fender in the front fender.

To the above end, the present invention contemplates that in construction of a mudguard of a movable fender portion in a motor vehicle, the rear end portion of the outer surface of said wheel arch flare is extended in a manner to cover the outer surface of the forward end portion of said movable fender when the side door is closed.

To the above end, the present invention contemplates that in construction of a mudguard of a movable fender portion in a motor vehicle, said movable fender portion comprises a portion of said front fender, said portion being disposed rearwardly of the front wheel and generally being lower than the top of said front rotary link.

DETAILED DESCRIPTION OF THE INVENTION

Description will hereunder be given of an embodiment of the present invention with reference to the accompanying drawings.

Figure 1:
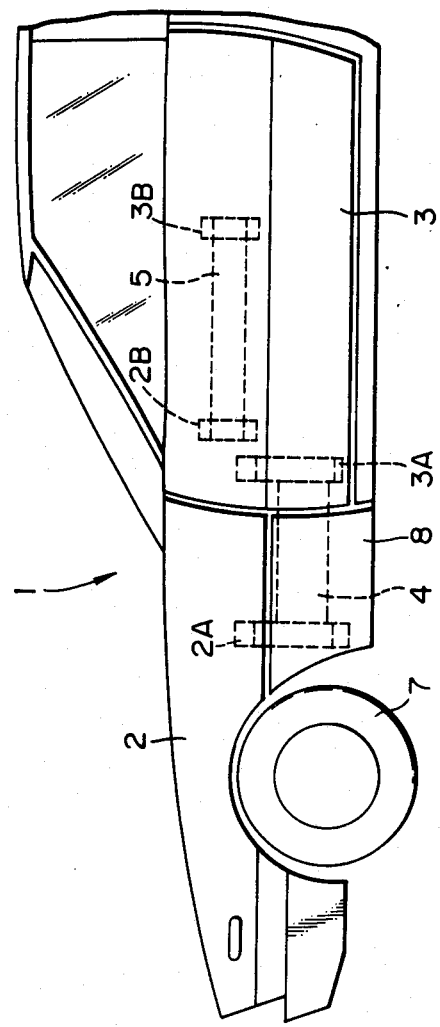
FIG. 1 is a side view showing a motor vehicle provided with the side door hinge quadric crank chain mechanism, to which the present invention is to be applied.
Figure 2:
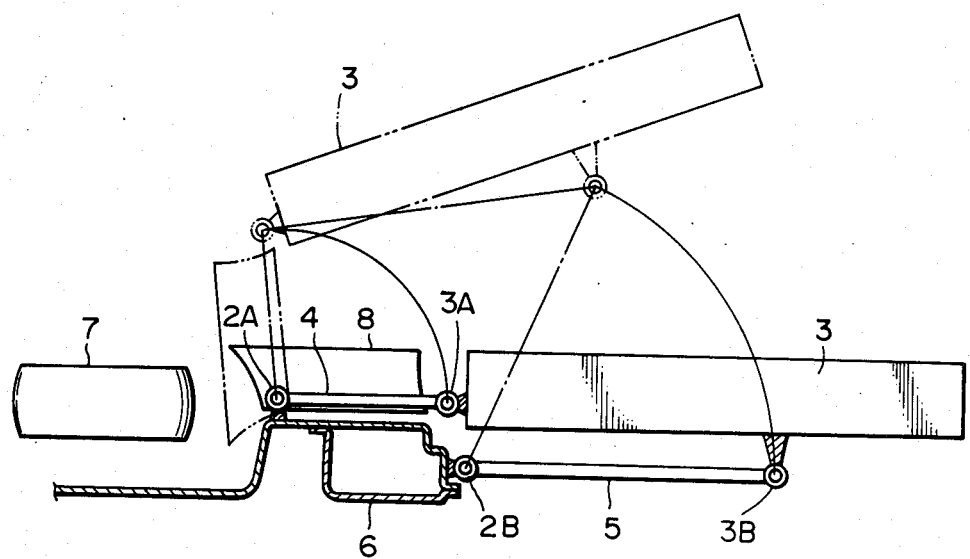
FIG. 2 is a schematic sectional plan view showing the action of the side door hinge in the above motor vehicle.
Figure 4:
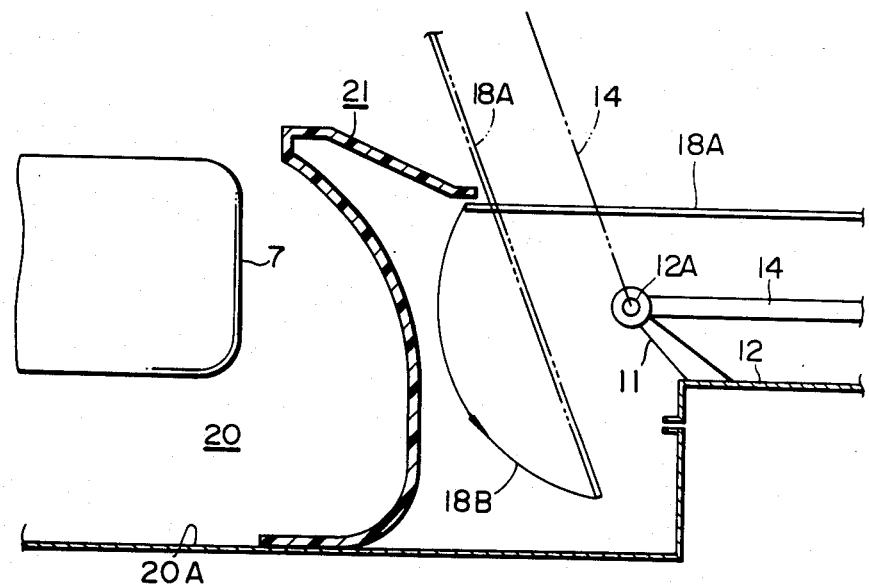
FIG. 4 is an enlarged sectional view taken along the line IV—IV in FIG. 3.
Figure 3:
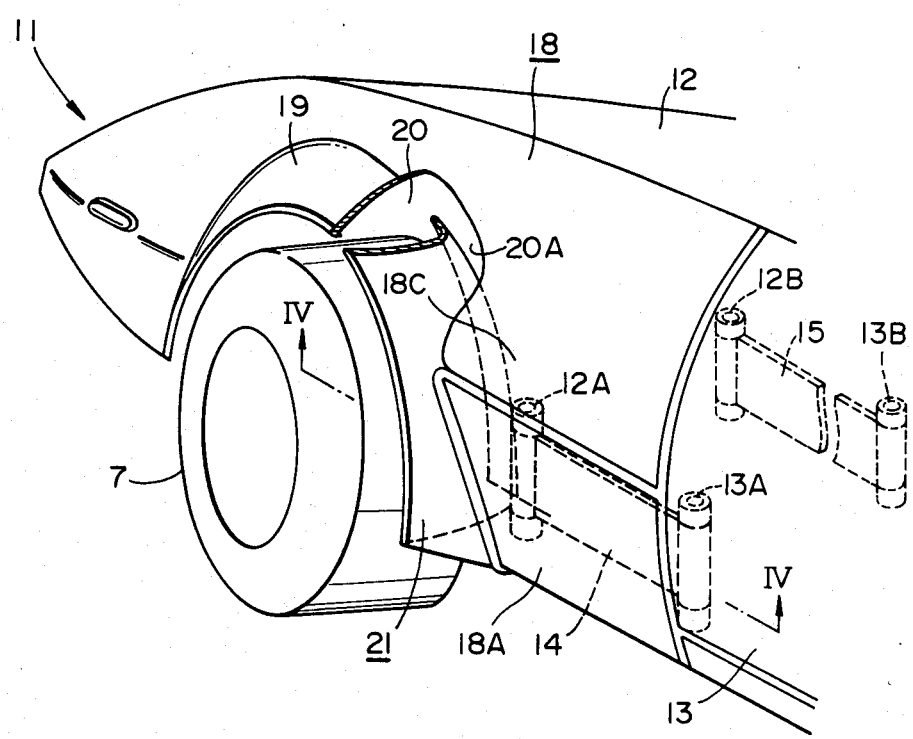
FIG. 3 is a perspective view showing an embodiment of the mudguard of the movable fender portion in the motor vehicle according to the present invention.

As shown in FIGS. 3 and 4, according to this embodiment, in construction of a mudguard of a movable fender portion in a motor vehicle 11 provided therein with a side door hinge a quadric crank chain comprises: a front rotary link 14 interconnecting two points, rotary shafts 12A and 13A, which are disposed at the front side of a vehicle body 12 and at the frontal portion of a side door 13 in the motor vehicle 11 respectively the rotary shaft 12a being mounted on support means 11 disposed on the vehicle body on frame 12 as shown in FIG. 4; a rear rotary link interconnecting rotary shafts 12B and 13B disposed on the vehicle body 12 and the side door 13 and spaced upward and rearward from the rotary shafts 12A and 13A along the longitudinal direction of the vehicle body 12 and; a portion between the rotary shafts 12A and 12B on the vehicle body 12; and a portion between the rotary shafts 13A and 13B on the side door 13, wherein a portion of a fender 18 covering the outer surface of at least a part of the front rotary link 14 is formed into a movable fender 18A rotatable integrally with the rotary shaft of the front rotary link 14 as centered thereabout, a portion of a wheel arch flare 19 positioned at least forwardly of the movable fender 18A is extended in to a wheel house 20 at a position forwardly of a moving path of the movable fender 18A, and the forward end of the extension is connected to an inner wall 20A of the wheel house 20, whereby a mudguard 21 made of synthetic resin and partitioning the front wheel 7 from the movable fender 18A is formed.

More specifically, an end portion of the inner periphery of the wheel arch flare 19 is disposed at a position close to the outer periphery of the front wheel 7 is general, this wheel arch flare 19 is extended to the inner wall 20A of the wheel house at a position between the front wheel 7 and the movable fender 18A in a manner not to interfere with a moving path 18B, along which the movable fender 18A moves during the opening of the door as shown in FIG. 4, whereby the wheel arch flare 19 is secured to the inner wall 20A in this wheel house.

The rear end portion of the outer surface of said wheel arch flare 19 is extended in a manner to cover the outer surface of the forward end portion of said movable fender 18A when the side door 13 is closed.

The movable fender 18A comprises a portion of said fender 18, the portion being disposed rearwardly of the front wheel 7 and generally being lower than the top of the front rotary link 14.

In consequence, in this embodiment, the muddy water and the like splashed up by the front wheel 7 are obstructed by a mudguard 21, and prevented from reaching the inner surface of the movable fender 18A, the rotary shaft 12A, the rotary link 14 or the front pillar 6 portion.

In this embodiment, the mudguard 21 is made of synthetic resin. However, the mudguard 21 may be made any of other material such as metal.

Furthermore, in the above embodiment, the mudguard 21 is formed separately of a portion other than the movable fender 18A of the fender 18, i.e. an upper fender 18C. However, the present invention need not necessarily be limited to this, and, the mudguard 21 may be formed integrally with the upper fender 18C.

In the above cases, the installation of the mudguard is facilitated.

What is claimed is:

1. A tire mudguard for a vehicle having a movable fender comprising:

a vehicle frame including a wheel section, a fender section and a door section, said fender section being positioned substantially between said wheel section and said door section when the door is closed, said wheel section having an arcuate inner wall radially spaced from the tire to extend across the tire and around a predetermined amount of the circumference of the tire, said inner wall having a bowed outer edge extending radially inward, said wheel section also having a side wall extending substantially radially outward from said outer edge, said side wall having a distal portion proximate said fender section, said fender section having a movable member and a fixed member, said movable member having a leading edge proximate said distal portion;

support means adapted to be mounted on said vehicle frame for supporting said movable member and said door section;

first pivot arm means for pivotally connecting said movable member between said support means and said door section; and second pivot arm means for pivotally connecting said door section to said vehicle frame, wherein opening of said door section pivots said movable member about said support means producing an arcuate path of movement for said leading edge, while preventing engagement between said movable member and said wheel section, said arcuate path of movement extending substantially between said support means and said wheel section.

2. The tire mudguard defined in claim 1, wherein said distal portion overlaps said leading edge when said door section is closed, and said distal portion and said leading edge are aligned in substantially parallel relation when said door section is closed.

3. The tire mudguard defined in claim 1, wherein said wheel section is integrally connected to said fixed member of said fender section and wherein said distal portion overlaps said leading edge when said door section is closed, and said distal portion and said leading edge are aligned in substantially parallel relation when said door section is closed.

4. The tire mudguard defined in claim 1, wherein said wheel section is separate from said fixed member of said fender section and wherein said distal portion overlaps said leading edge when said door section is closed, so that said distal portion and said leading edge are aligned initially in substantially parallel relation when said door section is closed.

5. The tire mudguard defined in claim 2, wherein said wheel section is positioned forward of said fender section and said movable member extends lower than said first pivot means.

6. The tire mudguard defined in claim 3, wherein said wheel section is positioned forward of said fender section and said movable member extends lower than said first pivot means.

7. The tire mudguard defined in claim 4, wherein said wheel section is positioned forward of said fender section and said movable member extends lower than said first pivot means.

8. A tire mudguard for a vehicle having a movable fender comprising:

a vehicle frame including a wheel section, a fender section and a door section, said fender section being positioned substantially between said wheel section and said door section, said wheel section having an arcuate inner wall radially spaced from the tire to extend across the tire and around a predetermined amount of the circumference of the tire, said inner wall having a bowed outer edge extending radially inward, said wheel section also having a side wall extending radially outward from said outer edge, said side wall having a distal portion proximate said fender section, said fender section having a movable member and a fixed member, said movable member having a leading edge proximate said distal portion;

support means adapted to be mounted on said vehicle frame for supporting said movable member and said door section; and means for pivotally connecting said movable member and said door section to said support means, said movable member extending between said support means and said door section, wherein opening of said door section pivots said movable member about said support means producing an arcuate path of movement for said leading edge, while preventing engagement between said movable member and said wheel section, said arcuate path of movement extending substantially between said support means and said wheel section.

* * * * *